(12) United States Patent
Foerg

(10) Patent No.: US 10,702,726 B2
(45) Date of Patent: Jul. 7, 2020

(54) FIRE-PROTECTION ELEMENT AS WELL AS METHOD FOR MANUFACTURING A FIRE-PROTECTION ELEMENT

(71) Applicant: HILTI AKTIENGESELLSCHAFT, Schaan (LI)

(72) Inventor: Christian Foerg, Dillishausen (DE)

(73) Assignee: Hilti Aktiengesellschaft, Schaan (LI)

( * ) Notice: Subject to any disclaimer, the term of this patent is extended or adjusted under 35 U.S.C. 154(b) by 35 days.

(21) Appl. No.: 16/094,530

(22) PCT Filed: May 15, 2017

(86) PCT No.: PCT/EP2017/061568
§ 371 (c)(1),
(2) Date: Oct. 18, 2018

(87) PCT Pub. No.: WO2017/198591
PCT Pub. Date: Nov. 23, 2017

(65) Prior Publication Data
US 2019/0118012 A1   Apr. 25, 2019

(30) Foreign Application Priority Data

May 18, 2016 (EP) .................................. 16170053

(51) Int. Cl.
*A62C 2/06* (2006.01)
*E04G 15/06* (2006.01)
(Continued)

(52) U.S. Cl.
CPC ............ *A62C 2/065* (2013.01); *E04G 15/061* (2013.01); *F16L 5/04* (2013.01); *F16L 5/10* (2013.01);
(Continued)

(58) Field of Classification Search
CPC . F16L 5/04; F16L 5/10; H02G 3/0412; H02G 3/22; A62C 2/065; B29C 44/367
See application file for complete search history.

(56) References Cited

U.S. PATENT DOCUMENTS 3,281,510 A * 10/1966 Lovret .................... B29C 44/30
264/46.2
3,439,075 A *  4/1969 Bauer ................... B29C 44/386
264/46.7
(Continued)

FOREIGN PATENT DOCUMENTS

CA     2917180 A1 *  1/2015  ............... H02G 3/22
DE   19600369 A1 *  1/1997  ............... A62C 2/12
(Continued)

OTHER PUBLICATIONS

English translation of Written Opinion dated Jul. 18, 2017 in PCT/EP2017/061568.

*Primary Examiner* — Adriana Figueroa
(74) *Attorney, Agent, or Firm* — Grüneberg and Myers PLLC

(57) ABSTRACT

A fire-protection element can be formed to accommodate a line penetration. The fire-protection element includes a substantially cylindrical housing, which has an inner side that defines a duct for at least one line and/or one pipe, where an intumescent material is sprayed directly onto at least portions of the inner side of the housing.

19 Claims, 5 Drawing Sheets

Figure 1:
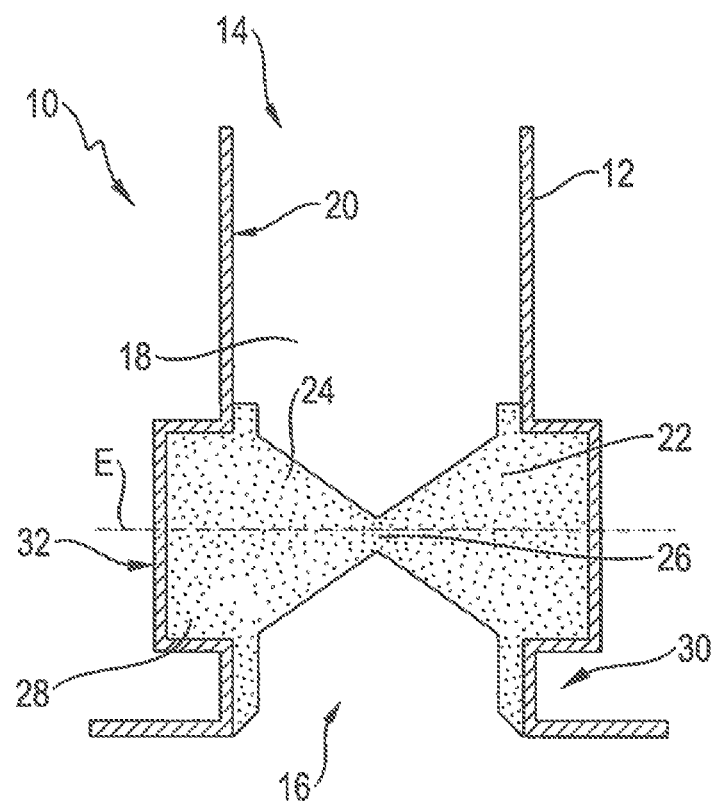

(51) Int. Cl.
*F16L 5/04* (2006.01)
*F16L 5/10* (2006.01)
*H02G 3/04* (2006.01)
*H02G 3/22* (2006.01)
*B29C 44/36* (2006.01)

(52) U.S. Cl.
CPC ......... *H02G 3/0412* (2013.01); *B29C 44/367* (2013.01); *H02G 3/22* (2013.01)

(56) References Cited

U.S. PATENT DOCUMENTS

| | | | | |
|---|---|---|---|---|
| 3,872,199 | A * | 3/1975 | Ottinger | B29C 44/22 264/46.4 |
| 4,409,768 | A * | 10/1983 | Boden | E04C 2/384 52/309.4 |
| 4,669,759 | A * | 6/1987 | Harbeke | A62C 2/065 277/314 |
| 5,309,688 | A * | 5/1994 | Robertson | F16L 5/12 52/220.8 |
| 6,161,873 | A * | 12/2000 | Munzenberger | E04G 15/061 285/3 |
| 6,643,985 | B2 * | 11/2003 | Munzenberger | E04G 15/061 285/187 |
| 8,696,966 | B2 * | 4/2014 | Smith | B29C 39/10 264/261 |
| 9,074,367 | B2 | 7/2015 | Muenzenberger | |
| 9,145,987 | B2 | 9/2015 | Muenzenberger | |
| 2003/0051423 | A1 | 3/2003 | Munzenberger | |
| 2003/0192269 | A1 | 10/2003 | Radke et al. | |
| 2005/0017391 | A1 * | 1/2005 | Kobayashi | B29C 43/183 264/46.4 |
| 2012/0304979 | A1 * | 12/2012 | Munzenberger | H02G 3/088 126/314 |
| 2013/0068487 | A1 | 3/2013 | Klein et al. | |
| 2014/0007373 | A1 | 1/2014 | Muenzenberger | |
| 2014/0020315 | A1 | 1/2014 | Muenzenberger | |
| 2017/0030490 | A1 * | 2/2017 | Vandertook | F16J 15/065 |

FOREIGN PATENT DOCUMENTS

| | | | |
|---|---|---|---|
| DE | 19627987 A1 * | 1/1997 | ............ A62C 2/065 |
| DE | 29712909 U1 * | 10/1997 | ............ A62C 2/065 |
| DE | 297 12 909 U1 | 11/1997 | |
| DE | 198 06 012 | 8/1999 | |
| DE | 10125177 A1 * | 12/2002 | ............ F23J 13/00 |
| EP | 1 293 714 | 3/2003 | |
| EP | 2 570 157 | 3/2013 | |
| EP | 2 682 657 | 1/2014 | |
| EP | 2 689 808 | 1/2014 | |
| FR | 2370139 A2 * | 6/1978 | ............ E04B 1/94 |

* cited by examiner

FIRE-PROTECTION ELEMENT AS WELL AS METHOD FOR MANUFACTURING A FIRE-PROTECTION ELEMENT

This application is a National Stage entry under § 371 of International Application No. PCT/EP2017/061568, filed on May 15, 2017, and claims priority to European Patent Application No. 16170053.9, filed on May 18, 2016.

The invention relates to a fire-protection element as well as to a method for manufacturing the same.

Typically, fire-protection elements are used during the construction of buildings, in order to prepare a line penetration for a line and/or a pipe through a wall or ceiling and at the same time to ensure that two rooms separated from one another by the wall or ceiling are isolated from one another from the fire-protection viewpoint.

For this purpose, the fire-protection element is provided with an intumescent material, which expands due to the rising temperature in the fire situation and thus seals the line penetration, whereby propagation of fire through this opening is prevented or at least retarded. This represents the corresponding fire-protection function of the fire-protection element.

Beyond this, fire-protection elements prevent smoke from passing via the penetration in the wall or ceiling from one room to an adjacent room. For this purpose, a sealing element, such as a rubber lip or the like, is usually provided.

Accordingly, fire-protection elements must have properties such as imperviousness to smoke, mechanical robustness and a corresponding fire-protection function, which prevents propagation of fire.

Fire-protection elements in the form of so-called cast-in, drop-in or wall-sleeve products are usually used. The respective product type depends on the intended area of use, especially whether the product is inserted during casting of a concrete wall or concrete ceiling or into an existing concrete wall or concrete ceiling.

On the basis of the different areas of application as well as general use on a construction site, the fire-protection elements must have a certain mechanical stiffness and at the same time must have the smoke-gas-sealing function as well as the fire-protection function. In the fire-protection elements known from the prior art, therefore, usually several components that respectively have the corresponding properties or functions are linked to one another, so that the fire-protection element consisting of the several components has all properties and functions.

The fire-protection elements known from the prior art have the disadvantage that they must be joined to one another laboriously, especially only at the point of use. This increases the time and effort for assembly, which generally leads to higher costs.

The object of the invention is to provide a fire-protection element that needs little time and effort for assembly and that can be manufactured inexpensively.

The object is solved according to the invention by a fire-protection element with a substantially cylindrical housing, which has an inner side that defines a duct for at least one line and/or one pipe, and wherein an intumescent material is sprayed directly onto at least portions of the inner side of the housing, in particular is foamed directly onto the inner side.

The basic idea of the invention is to reduce the time and effort for assembly of the fire-protection element by the fact that the intumescent material is joined directly to the housing, so that subsequent assembly of the intumescent material on the housing of the fire-protection element is not necessary. The person applying this fire-protection element may use it directly without undertaking other assembly steps or first joining the fire-protection element together. Accordingly, the housing functions as a kind of lost formwork for the intumescent material. In addition, a fire-protection element that is simple to manufacture as well as inexpensive is obtained, since the intumescent material is joined directly to the inner side.

According to one aspect, the intumescent material is joined by substance-to-substance bonding to the inner side of the housing, in particular the intumescent material adheres to the inner side without the need for adhesives. The materials being used may therefore be reduced, since only the materials relevant to the fire-protection function are used, i.e. the intumescent material as well as the shape-generating housing. An adhesive or the like does not have to be used in order to fasten the intumescent material to the housing, since it is joined directly to the inner side of the housing. The manufacture of the fire-protection element is accordingly inexpensive.

In particular, the intumescent material is an intumescent foam. An intumescent foam is particularly well suited as an intumescent material disposed in the duct of the line or pipe penetration, since the foam is readily compressible and has good elastic recovery properties. In addition, via the foam, a large volume can be prepared with little material use of the relatively expensive intumescent material.

A further aspect of the invention provides that the housing has at least one lateral depression on the inner side, which among other purposes is used as a receiving portion for the intumescent material. The intumescent material may be additionally braced by the lateral depression, if the intumescent material does not adhere as desired to the inner side of the housing. In particular, it may be provided that the intumescent material is received interlockingly in the lateral depression. In general, it is therefore possible to use, for the housing, materials to which the intumescent material normally does not adequately adhere, since the receiving portion offers additional bracing.

According to one embodiment, an additional fire-protection strip is fastened on the inner side, especially in the lateral depression. The additional fire-protection strip ensures an adequate fire-protection function of the fire-protection element, especially if it has not been possible to include sufficient fire-protection additives in the intumescent material.

A further aspect to the invention provides that the intumescent material forms a sealing element in the duct, especially a sealing diaphragm. Accordingly, the intumescent material simultaneously provides for sealing of the duct, so that no smoke is able to travel through the duct from one room via the corresponding wall or ceiling into the adjacent room in the fire situation. Correspondingly, only one material, namely the intumescent material, is used to provide the imperviousness and the fire-protection function at the same time.

In general, it is ensured by the use of the intumescent material as the sealing element disposed in the duct that the intumescent material is provided directly at the proper position in the pipe or line penetration. Accordingly, during expansion in the fire situation, the intumescent material does not have to travel a long path in order to seal the pipe or line penetration.

In particular, the intumescent material is formed in such a way that the intumescent material completely seals the duct. Accordingly, the corresponding sealing function is also provided when no line or pipe is routed through the fire-protection element, especially its duct.

One aspect provides that the intumescent material forms a sealing plane in a cross-sectional plane of the fire-protection element. The sealing plane is the region in which the intumescent material substantially seals the duct in gas-tight manner together with the pipe or line, so that no smoke gas is able to pass over the sealing plane through the duct. In general, the intumescent material may accordingly be formed such that as little material as possible is used to ensure that imperviousness of the fire-protection element is nevertheless provided. This is achieved in simple manner by the fact that the intumescent material seals the cross section of the duct at least substantially at least in one cross-sectional plane of the fire-protection element.

A further aspect of the invention provides that the intumescent material has a region with smaller material thickness in axial direction, wherein the region functions as a predetermined breaking point or puncture point. In the corresponding region, a person applying the fire-protection element may route a cable or line simply through the fire-protection element, especially through the intumescent material. To do so, he or she must merely puncture the corresponding region containing the line or pipe mechanically. This is possible, because the material in the corresponding region is designed to be physically weak.

According to one embodiment, the intumescent material extends from the inner side in centripetal direction to the center of the duct, especially in a cross-sectional plane of the fire-protection element. Hereby a sealing plane of continuous intumescent material may be formed, so that the sealing element represents a sealing diaphragm. Preferably, the sealing plane is situated in the region with small material thickness.

Alternatively, the intumescent material seals the duct only partly in a cross-sectional plane of the fire-protection element. For example, a region is cut out centrally, so that the intumescent material forms a sealing lip, which with its preferably extensible free rim forms a guide for the pipe and/or the at least one line.

The sealing plane may be formed by the sealing lip or by the intumescent material extending in centripetal direction to the center of the duct.

The housing may be formed from a flexurally stiff material, especially from a plastic such as polyethylene or polypropylene, so that the housing is stabilizing. Accordingly, the housing functions merely for shaping the fire-protection element, so that it satisfies the requirements of a building site and may be used there. Furthermore, the housing and thus the fire-protection element may be manufactured inexpensively.

According to one embodiment, the housing has at least one opening, which discharges into the duct, especially two openings, which are in communication with one another via the duct. Thus the housing can be rapidly inserted and the line or pipe can be routed through the penetration in simple manner.

Additionally or alternatively, at least one axial end of the housing may be closed temporarily with a separating element or cover, which may be cut out or broken out in order to form the opening at the corresponding axial end. This is of importance in particular when the fire-protection element is used as a so-called cast-in product during casting of the concrete wall or concrete ceiling. Accordingly, the separating element or cover serves as protection against the liquid concrete, so that this cannot flow into the duct of the fire-protection element during casting of the wall or ceiling.

A further aspect provides that the housing, viewed in axial direction, has at least one undercut on its outer side, via which the fire-protection element can be fastened to a building part to be manufactured. The undercut functions for fastening of the fire-protection element during casting of the building part to be manufactured, i.e. a concrete ceiling or concrete wall.

The object of the invention is additionally solved by a method for manufacturing a fire-protection element, wherein a substantially cylindrical housing is provided that has at least one opening, which discharges into a duct that is defined by an inner side of the housing. A first profile element of a tool is introduced into the duct. Intumescent material is introduced into the duct, so that it fills the duct at least partly, depending on the shape of the introduced profile element. A second profile element of the tool is introduced into the duct via the at least one opening, so that the tool is closed, wherein the second profile element is disposed opposite the first profile element, so that the intumescent material introduced beforehand is clamped and correspondingly shaped by the two profile elements. The intumescent material is cured. The profile elements are removed.

It is also possible to introduce intumescent material into the duct by injection through the second profile element, after this has been introduced on the first profile element into the duct, so that the intumescent material fills the duct in dependence on the shape of the introduced profile elements.

Hereby it is possible in simple manner to create a fire-protection element in which the intumescent material is applied directly onto the inner side of the housing. The correspondingly manufactured fire-protection element comprises few components, whereby its manufacture is inexpensive.

One aspect provides that the first profile element is introduced via a second opening of the housing that is provided on the end of the housing opposite the first opening, especially the opposite end. This simplifies the manufacture, since the first profile element can be inserted into the duct in simple manner.

Alternatively, the first profile element may be introduced via the first opening of the housing, so that it must be moved first through the entire duct. This is a manufacturing variant in particular when the fire-protection element has a cover or separating element that will subsequently be cut out or broken out.

According to one aspect, the intumescent material is sprayed, especially foamed, onto the inner side of the duct. This ensures that the intumescent material adheres to the housing without the need for adhesive, so that a substance-to-substance bond is created.

Figure 2:
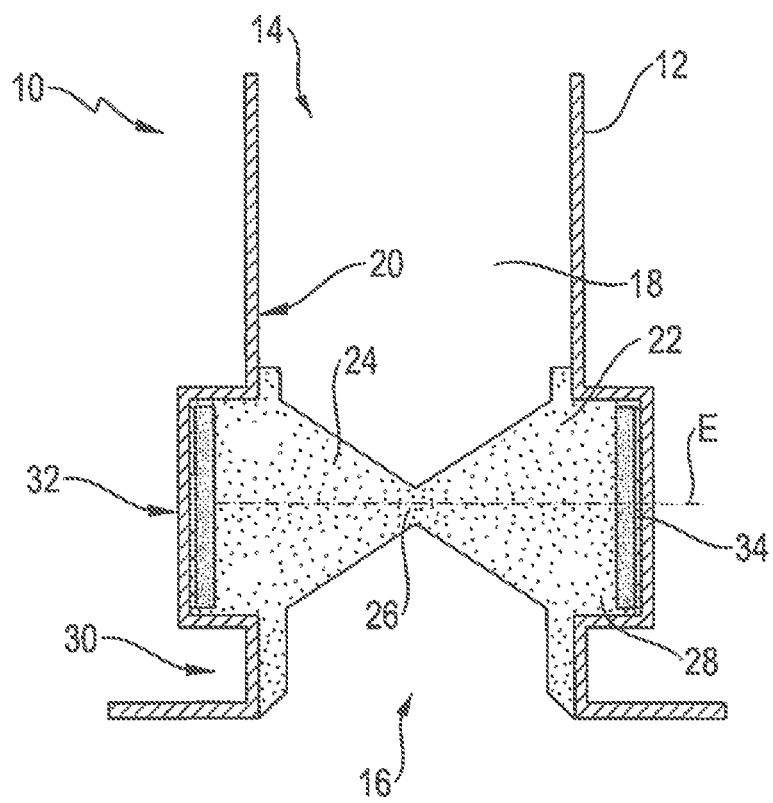
Figure 3:
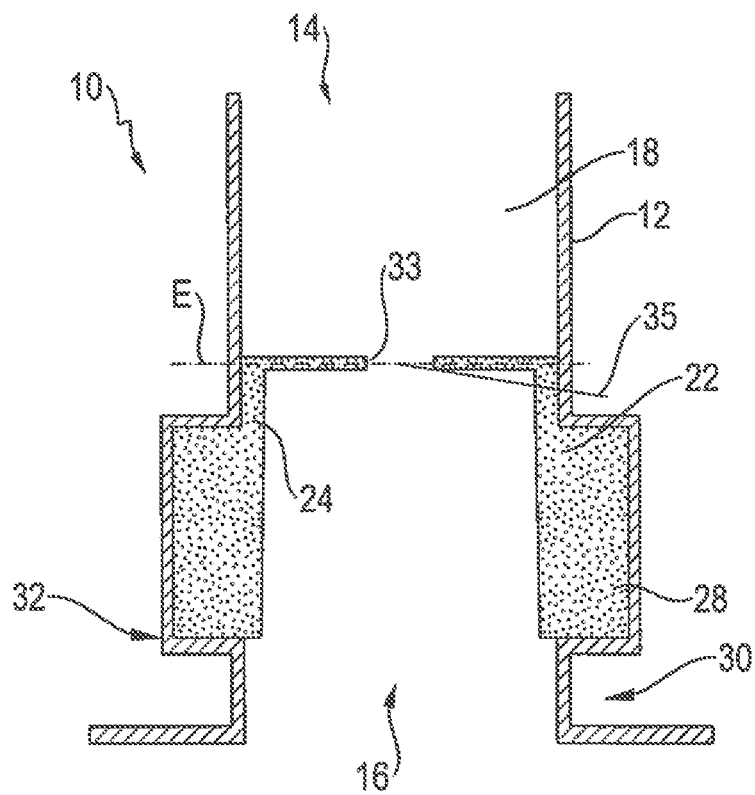
Figure 4:
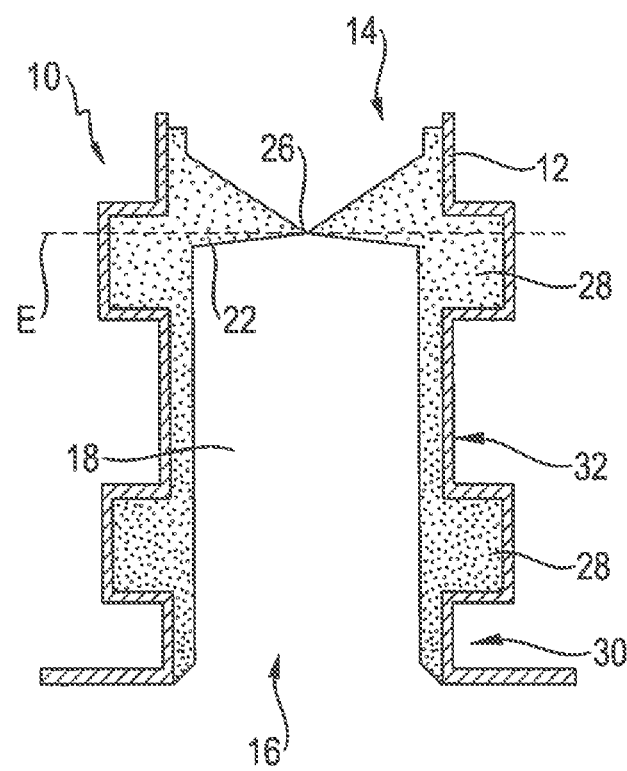
Figure 5:
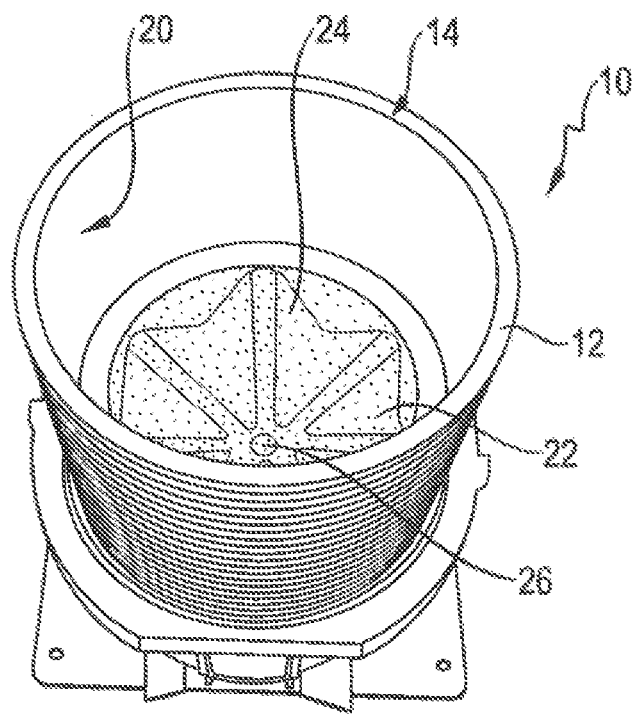
Figure 6:
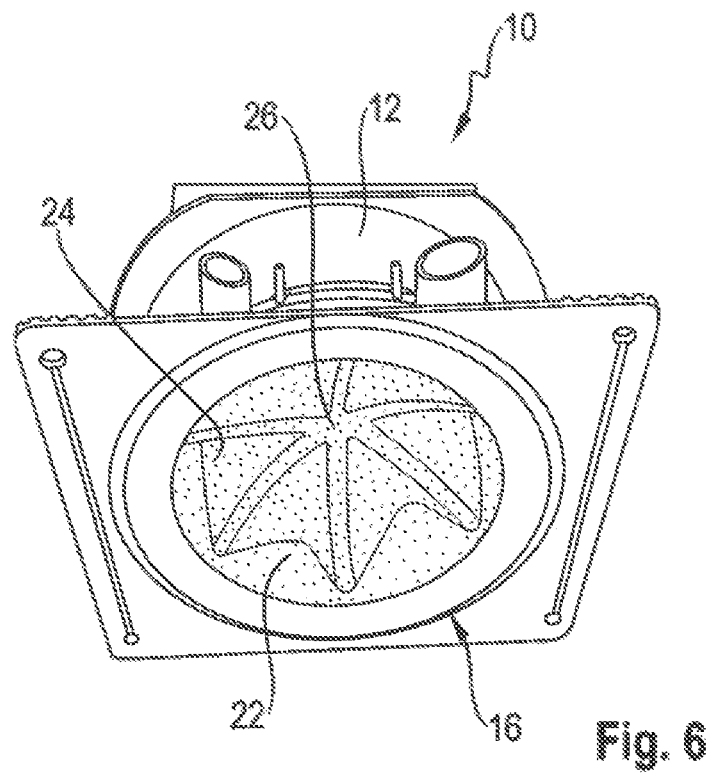
Figure 7:
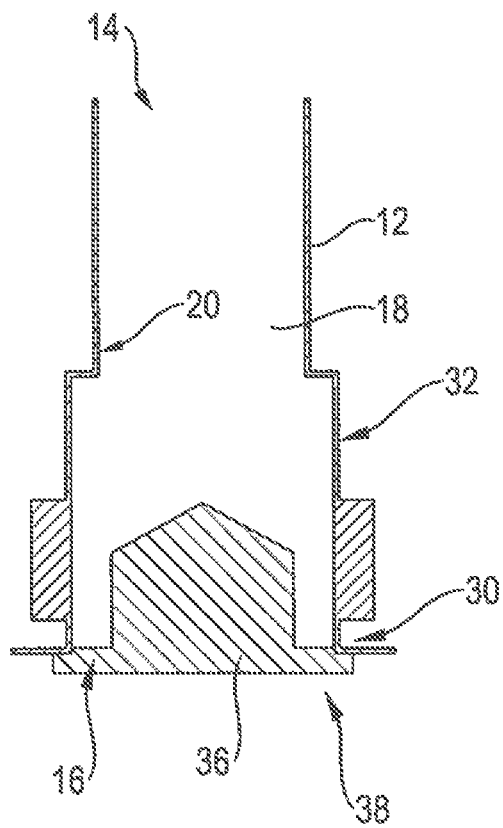
Figure 8:
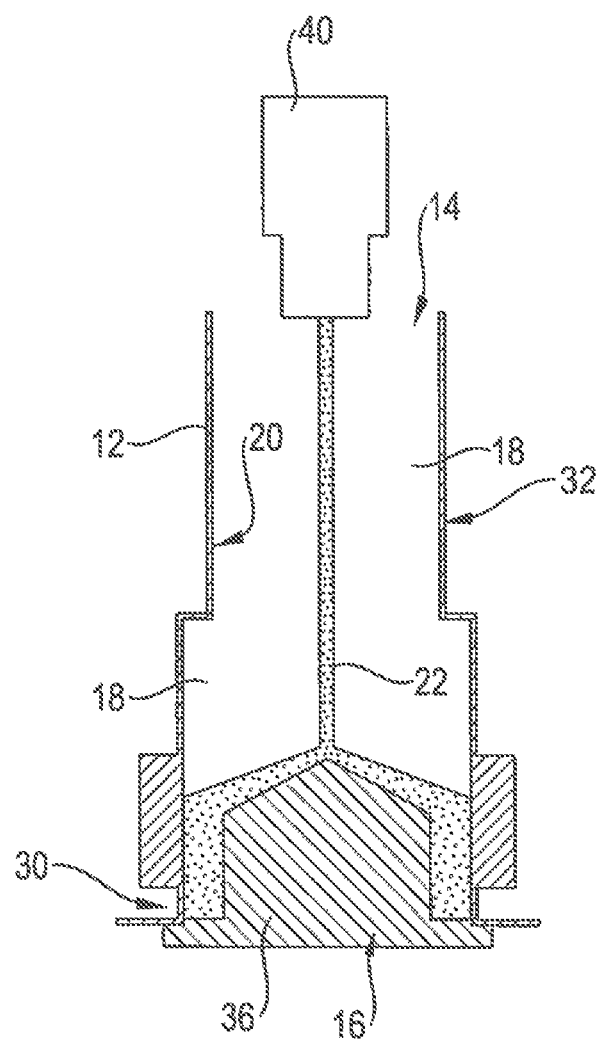
Figure 9:
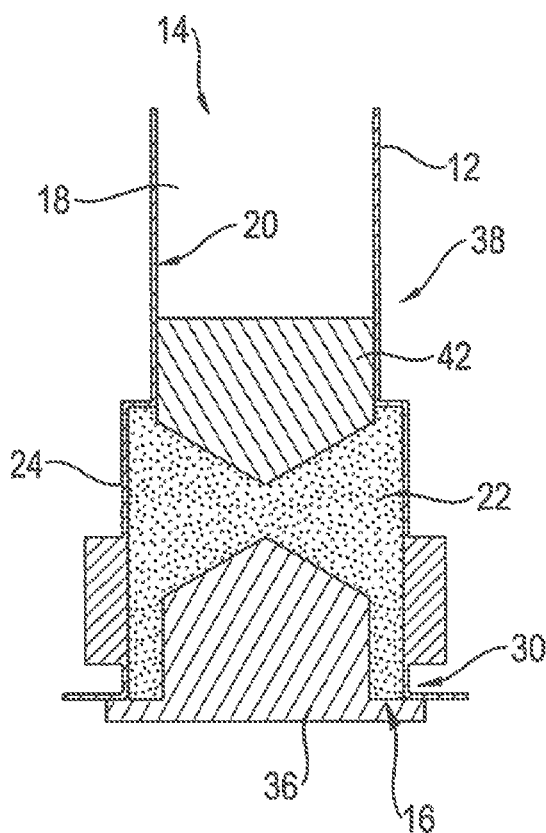
Figure 10:
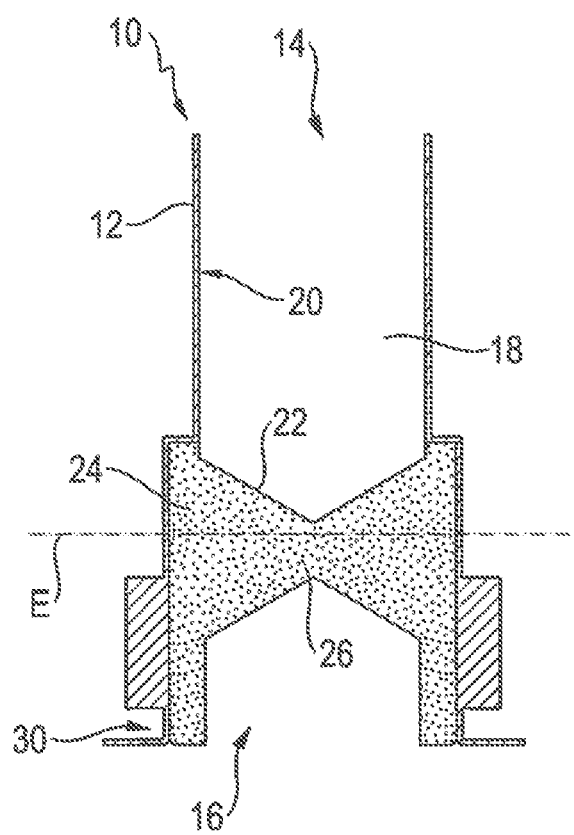

Further advantages and properties of the invention will become apparent from the description hereinafter and from the drawings, to which reference is made. In the drawings:

FIG. 1 shows a schematic sectional diagram of an inventive fire-protection element according to a first embodiment, FIG. 2 shows a schematic sectional diagram of an inventive fire-protection element according to a second embodiment, FIG. 3 shows a schematic sectional diagram of an inventive fire-protection element according to a third embodiment, FIG. 4 shows a schematic sectional diagram of an inventive fire-protection element according to a fourth embodiment, FIG. 5 shows a perspective diagram of an inventive fire-protection element according to a fifth embodiment, FIG. 6 shows a further perspective diagram of the inventive fire-protection element according to FIG. 5, FIG. 7 shows the inventive manufacture of an inventive fire-protection element in a first method step, FIG. 8 shows the inventive manufacture of an inventive fire-protection element in a second method step, FIG. 9 shows the inventive manufacture of an inventive fire-protection element in a third method step, and FIG. 10 shows the inventive manufacture of an inventive fire-protection element in a fourth method step, FIG. 1 shows a fire-protection element 10, which comprises a substantially cylindrical housing 12. Fire-protection element 10 is used to construct a penetration for a pipe or line in a building part (to be manufactured), such as a concrete wall or concrete ceiling, wherein the penetration is additionally made safe from the viewpoint of fire protection.

The cylindrical housing 12 has a first opening 14 as well as a second opening 16, which are in communication with one another via a duct 18, which is defined by inner side 20 of housing 12. Duct 18 is used for routing at least one line and/or one pipe, which may be laid through duct 18.

Fire-protection element 10 additionally comprises an intumescent material 22, which is sprayed onto the inner side 20 of housing 12 so that it is joined to inner side 20 of housing 12 by substance-to-substance bonding.

In the shown embodiment, intumescent material 22 is formed as an intumescent foam, so that intumescent material 22 is readily compressible and has a high elastic recovery ability.

In the shown embodiment, intumescent material 22 is formed as a sealing element 24 in duct 18, wherein it extends from inner side 20 of housing 12 in centripetal direction to the center of duct 18, in such a way that it completely seals duct 18.

In the process, a sealing plane E of continuous intumescent material 22 is formed in a cross-sectional plane of fire-protection element 10. Accordingly, intumescent material 22 forming sealing plane E extends completely through duct 18 in the corresponding cross-sectional plane of fire-protection element 10. In this respect, sealing element 24 formed by intumescent material 22 may also be referred to as a sealing diaphragm.

In sealing plane E, it is ensured by intumescent material 22 in conjunction with the pipe or line that no smoke can pass via duct 18 from one room into an adjacent room that are in communication with one another via fire-protection element 10.

In addition, intumescent material 22 forms a region 26, which has smaller material thickness in axial direction and functions as a predetermined breaking point or puncture point for the line or pipe. By virtue of this region 26, the person applying fire-protection element 10 is able to punch the line or pipe easily through intumescent material 22, so that on the one hand it is guided by intumescent material 22 and on the other hand is surrounded by it.

In the shown embodiment, region 26 with smaller material thickness in axial direction lies in sealing plane E.

Beyond this, housing 12 in the shown embodiment has a lateral depression 28 on inner side 20, which functions as a receiving portion for intumescent material 22.

Lateral depression 28 provides for an additional interlocking joint of intumescent material 22 in housing 12, so that intumescent material 22 is held by housing 12 even if it is no longer adhering to inner side 20 of housing 12. Hereby it is ensured that intumescent material 22 is durably mounted in correct position relative to housing 12, even if intumescent material 22 is no longer adhering to inner side 20.

Intumescent material 22 additionally adheres to further regions of inner side 20 of housing 12, especially to regions adjacent to lateral depression 28.

Beyond this, housing 12, viewed in axial direction, has an undercut 30 on its outer side 32, especially in the region of second opening 16. Via undercut 30, fire-protection element 10 may be fastened onto a building part to be manufactured, especially its formwork. Hereby it is possible, for example, to use fire-protection element 10 as a so-called cast-in product, which, during casting of a concrete wall or concrete ceiling, is first joined to to its formwork.

Alternatively, fire-protection element 10 may be used as a so-called wall-sleeve or drop-in product. For this purpose, a collar protruding radially outward and resting via fire-protection element 10 on the concrete wall or concrete ceiling may be provided instead of undercut 30.

Housing may 12 be formed in general from a flexurally stiff material, especially from a plastic, so that housing 12 exerts a stabilizing effect on fire-protection element 10. In particular, materials such as polyethylene or polypropylene, which are inexpensive, may be used, whereby a fire protection element 10 is created that is easy to manufacture and inexpensive.

In choosing the material of housing 12, it is not absolutely necessary to ensure that intumescent material 22 enters into a permanently adhering bond with housing 12, especially its inner side 20, since intumescent material 22 is held interlockingly in housing 12 via lateral depression 28 among other features.

Alternatively, fire-protection element 10 may be a firestop collar, which is wrapped around a pipe. For this purpose, housing 12 is designed to be at least partly flexible, so that it may be wrapped around an existing pipe.

FIG. 2 shows a second embodiment of fire-protection element 10, which differs from the first embodiment in that an additional fire-protection strip 34 is provided, which is disposed on inner side 20 of housing 12, especially in lateral depression 28.

Among other options, intumescent material 22 has been applied on additional fire-protection strip 34, so that additional fire-protection strip 34 is disposed between intumescent material 22 and inner side 20.

Via additional fire-protection strip 34, it is possible to use an intumescent foam that contains only little fire-protection additives, wherein fire-protection element 10 nevertheless has an adequate fire-protection function by virtue of additional fire-protection strip 34.

FIG. 3 shows a third embodiment of fire-protection element 10, in which sealing plane E has been shifted in the direction of first opening 14 in housing 12 compared with the embodiment of fire-protection element 10 shown in FIG. 1.

Intumescent material 22 forms sealing element 24, although in the shown embodiment it does not seal duct 18 completely. Such a construction of intumescent material 22 is suitable in particular when fire-protection element 10 is provided for a pipe penetration.

Free end 33 of intumescent material 22, which extends in centripetal direction from inner side 20 in the direction of the center of duct 18, forms a sealing lip, which conforms to the pipe within the penetration and thus ensures sealing in the corresponding sealing plane E.

Intumescent material 22 forming sealing plane E, or the sealing lip formed in this way, then serves as a flexible guide 35 for the pipe routed through duct 18.

FIG. 4 shows a fourth embodiment of fire-protection element 10, in which housing 12 has several lateral depressions 28.

Beyond this, sealing plane E is also shifted toward first opening 14 in this embodiment compared with the first embodiment.

By virtue of the several lateral depressions 28, in which intumescent material 22 is respectively received interlockingly, it is ensured that sealing element 24 is held sufficiently even when no permanent adhesion of intumescent material 22 on housing 12 can be assured.

The specific construction of intumescent material 22, especially of sealing element 24, as well as the arrangement of intumescent material 22 on inner side 20 of housing 12, depends respectively on the area of use as well as the area of application of fire-protection element 10.

FIGS. 5 and 6 show a fifth embodiment of fire-protection element 10, in which intumescent material 22 likewise forms a sealing diaphragm in duct 18, which contains a region 26 with smaller material thickness in axial direction and functions as a predetermined breaking point or puncture point for the at least one line and/or pipe.

FIGS. 7 to 10 show how an inventive fire-protection element 10 is manufactured, as will be explained hereinafter.

First of all housing 12 is prepared, wherein a first profile element 36 of a tool 38 is introduced into duct 18 (see FIG. 7). In the shown embodiment, first profile element 36 is introduced into duct 18 via second opening 16 of housing 12.

Then intumescent material 22 is introduced into duct 18 (see FIG. 8), so that it fills duct 18 at least partly, depending on the shape of first profile element 36. For this purpose, a dosing unit 40 may be used, in order to adjust the quantity of intumescent material 22.

Then a second profile element 42 of tool 38 is introduced into duct 18 (see FIG. 9), especially via first opening 14, so that tool 38 is closed.

The two profile elements 36, 42 are then situated oppositely, so that intumescent material 22 introduced beforehand is clamped by the two profile elements 36, 42 and is formed in a manner corresponding to their shapes.

Intumescent material 22 then cures in the closed position of tool 38.

Finally, profile elements 36, 42 are removed and tool 38 is opened (see FIG. 10), so that intumescent material 22 forms sealing element 24, which is disposed in duct 18 of fire-protection element 10.

Depending on the chosen intumescent material 22, this may be sprayed onto inner side 20 of duct 18, especially foamed onto inner side 20.

In the shown embodiment variant of the manufacturing method, both profile elements 36, 42 of tool 38 have a profile that is conical in cross section. Hereby region 26 with smaller material thickness in axial direction can be formed in simple manner.

However, other cross sections and profiles of intumescent material 22 and of sealing element 24 may also be achieved by using corresponding profile elements 36, 42 of tool 38.

In general, a fire-protection element 10 can be easily manufactured inexpensively in this way, since few components are used.

Beyond this, the time and effort for assembly are significantly reduced, since intumescent material 22 is sprayed directly onto housing 12, so that subsequent assembly of intumescent material 22 or of a component provided with intumescent material 22 is not necessary.

In addition, intumescent material 22 has several functions simultaneously, since it provides the fire-protection function on the one hand and imperviousness of fire-protection element 10 to smoke gas on the other.

The invention claimed is:

1. A fire-protection element, comprising:
   a substantially cylindrical housing, which has an inner side that defines a duct for at least one line and/or one pipe and which has at least one lateral depression on the inner side, and
   an intumescent material that is disposed on at least a portion of both the duct and the at least one lateral depression, wherein the intumescent material narrows a bore of the duct,
   wherein said intumescent material is disposed directly on at least portions of the inner side of the housing.

2. The fire-protection element according to claim 1, wherein
   the intumescent material is joined by substance-to-substance bonding to the inner side of the substantially cylindrical housing.

3. The fire-protection element according to claim 1, wherein
   the intumescent material is an intumescent foam.

4. The fire-protection element according to claim 1, further comprising:
   an additional fire-protection strip, which is fastened on the inner side.

5. The fire-protection element according to claim 4, wherein
   the additional fire-protection strip is disposed between the intumescent material and the inner side.

6. The fire-protection element according to claim 1, wherein
   the intumescent material forms a sealing element in the duct.

7. The fire-protection element according to claim 1, wherein
   the intumescent material is formed in such a way that the intumescent material completely seals the duct.

8. The fire-protection element according to claim 1, wherein
   the intumescent material has a region with smaller material thickness in axial direction relative to said substantially cylindrical housing, and
   wherein the region functions as a predetermined breaking point or puncture point.

9. The fire-protection element according to claim 1, wherein
   the substantially cylindrical housing is formed from a flexurally stiff material so that the substantially cylindrical housing is stabilizing.

10. The fire-protection element according to claim 1, wherein
    the substantially cylindrical housing has at least one opening, which discharges into the duct.

11. The fire-protection element according to claim 1, wherein
    the substantially cylindrical housing, viewed in axial direction, has at least one undercut on its outer side, via which the fire-protection element can be fastened to a building part to be manufactured.

12. A method for manufacturing the fire-protection element according to claim 1, the method comprising:
    a) providing a substantially cylindrical housing that has at least one opening and at least one lateral depression, wherein the at least one opening discharges into a duct that is defined by an inner side of the housing, b) introducing a first profile element of a tool into duct, c) introducing an intumescent material into the duct, so that the intumescent material fills the duct at least partly and at least a portion of the at least one lateral depression, depending on the shape of the introduced profile element, and wherein the intumescent material narrows a bore of the duct, d) introducing a second profile element of the tool into the duct via the at least one opening, so that the tool is closed, wherein the second profile element is disposed opposite the first profile element, so that the intumescent material introduced beforehand is clamped and correspondingly shaped by the two profile elements, e) curing the intumescent material, and f) removing the profile elements.

13. The method according to claim 12, wherein
the first profile element is introduced via a second opening of the housing that is provided on the end of the substantially cylindrical housing opposite a first opening.

14. The method according to claim 12, wherein
the intumescent material is sprayed onto the inner side of the housing.

15. The fire-protection element according to claim 1, wherein the intumescent material is foamed directly onto at least portions of the inner side of the housing.

16. The fire-protection element according to claim 1, wherein
the intumescent material is joined by substance-to-substance bonding, without an adhesive, to the inner side of the substantially cylindrical housing.

17. The fire-protection element according to claim 1, further comprising:
an additional fire-protection strip, which is fastened on the inner side in the depression thereof.

18. The fire-protection element according to claim 1, wherein
the intumescent material forms a sealing diaphragm in the duct.

19. The fire-protection element according to claim 9, wherein
the flexurally stiff material is at least one member selected from the group consisting of polyethylene and polypropylene.

* * * * *